United States Patent
Hagerty

[11] Patent Number: 6,156,412
[45] Date of Patent: Dec. 5, 2000

[54] DIFFRACTIVE FABRIC

[76] Inventor: Jon C. Hagerty, Box 183, Chelsea, Vt. 05038

[21] Appl. No.: 09/236,942

[22] Filed: Jan. 25, 1999

Related U.S. Application Data

[60] Provisional application No. 60/074,407, Feb. 11, 1998.

[51] Int. Cl.[7] .................................................. B32B 27/14
[52] U.S. Cl. ........................ 428/196; 359/568; 359/576; 442/65
[58] Field of Search ................................ 428/114, 195, 428/196; 442/65; 359/568, 576

[56] References Cited

U.S. PATENT DOCUMENTS

| | | | |
|---|---|---|---|
| 5,314,767 | 5/1994 | Bussard | 430/1 |
| 5,629,074 | 5/1997 | Klocek et al. | 428/212 |

*Primary Examiner*—Christopher Raimund

[57] ABSTRACT

A fabric is constructed to act as a diffraction grating for deBroglie waves of the continuous electromagnetic spectrum. The fabric is made by coating or laminating emissive layers on each side of a fabric and then etching one side to create a diffraction grating. The thickness of the fabric and the width of the etch determine diffracted wave lengths. Constructive or destructive interference can be established to increase the energy (constructive) or decrease the energy (destructive) of the waves diffracted proportionate to the amplitude squared.

3 Claims, 1 Drawing Sheet

DIFFRACTIVE FABRIC

CROSS REFERENCE TO RELATED CASE

This application claims benefit of U.S. Provisional Patent Ser. No. 60/074,407 filed Feb. 11, 1998.

BACKGROUND

1. Field of Invention

This invention relates to a fabric that acts as a diffractive grating for electromagnetic radiations.

2. Description of Prior Art

There are numerous applications of diffraction of deBroglie Waves through the use of crystals, etched metals and glasses, etc. Only one prior art has been located that describes a fabric that acts as a diffractive lens. U.S. Pat. No. 5,629,074 (Klocek et al.) describes durable polymeric optical systems. The invention herein described is a fabric that acts as a diffractive grating. The use of a grating allows modulation of waves re-radiated by the fabric. By selecting the thickness of the fabric and the width of the etch re-radiated waves can produce various interferences from constructive to destructive.

DRAWING FIGURES

In the drawings

Figure 1:
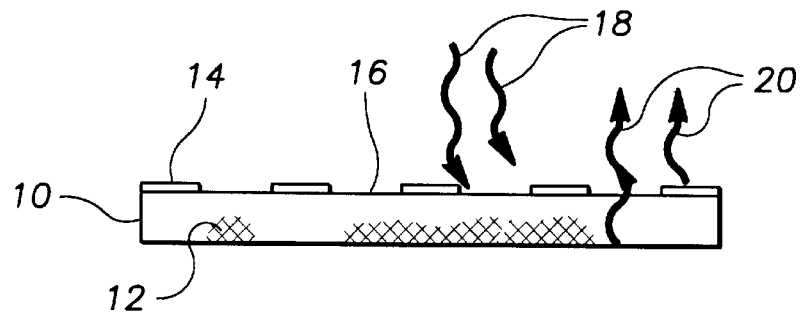
FIG. 1 shows an end view cross section.

REFERENCE NUMERALS IN DRAWINGS 10 diffractive fabric
12 emissive surface
14 emissive surface
16 etched diffractive grating
18 electromagnetic radiation from source
20 electromagnetic radiation diffracted from grating of fabric Summary In accordance with the present invention a fabric is structured as a diffractive grating of deBroglie waves of the continuous electromagnetic spectrum.

Figure 2:
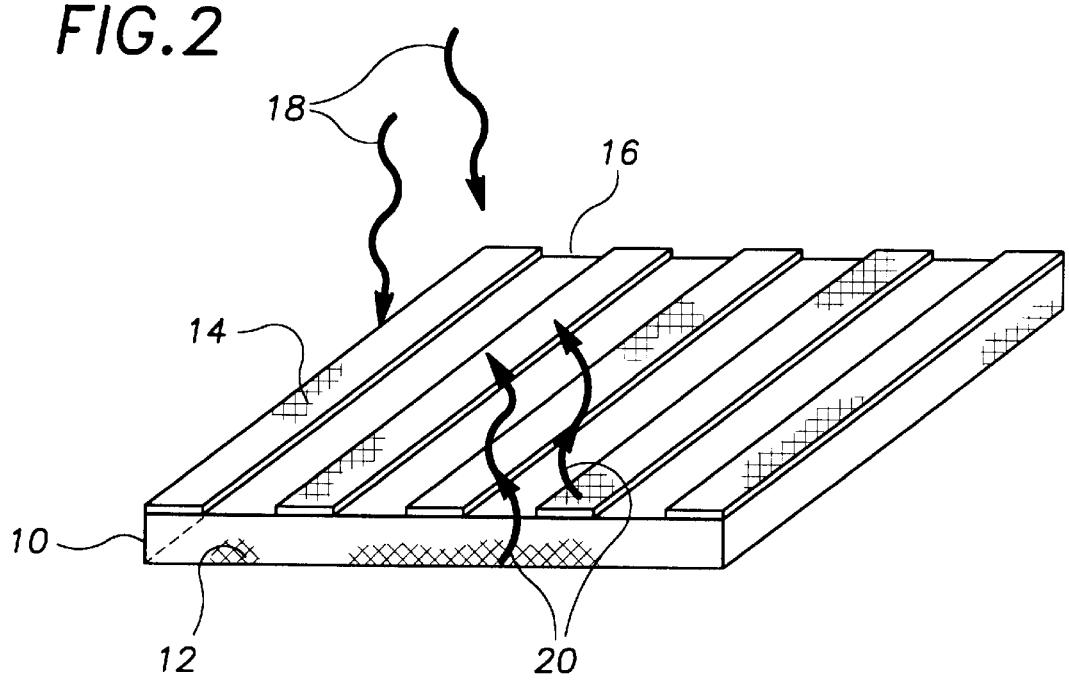
FIG. 2 shows a perspective view of the invention.

Description—FIG. 1 and 2

FIG. 1 shows the fabric from end view in cross section. 10 is the fabric comprised of 12 lower emissive surface, 14 upper emissive surface, 16 etched diffractive grating. 18 electromagnetic radiation from source and 20 diffracted electromagnetic radiation from grating i.e. fabric 10 are represented as well in the figures.

Operation—Main Embodiment

The figures describe the invention of a diffractive fabric 10 comprised of a lower emissive surface 12 an upper emissive surface 14 etched 16 to produce the diffractive grating. Radiation from a source 18 is reflected by the emissive surfaces 12 and 14. Those radiations reflected from 14 are of the same wave lengths as the source 18. The waves 18 that pass through the etch 16 are diffracted by the edges of the etch 16 thereby modulating the waves. The waves 20 that re-radiate back through the etch 16 can be tuned to specific wavelengths by selecting various fabric 10 thicknesses and etch widths 16. In one embodiment the waves diffracted 20 constructively interfere to increase the amplitude of the radiations 20 and thus increase the energy of the wave 20 proportionate to the amplitude squared. A second embodiment would be to produce destructive interference to reduce the amplitude of 20 thereby decreasing the energy of the wave 20 proportionate to the amplitude squared.

Conclusions, Ramifications, and Scope

The invention described herein relates to a diffractive fabric. Wave theory in physics indicates diffraction to be a means of modulating wave lengths of deBroglie waves of the continuous electromagnetic spectrum. A modulation that produces constructive interference of the diffracted waves increases the amplitude of the waves and thereby the energy of the wave proportionate to the amplitude squared. Modulation by diffraction that produces destructive interference decreases the amplitude of the waves and thereby the energy of the waves proportionate to the amplitude squared. By selecting fabric thickness and etch width of emissive fabrics various diffraction gratings can be structured to diffract various wave lengths of the continuous electromagnetic spectrum. The embodiments described are not intended to limit the scope and application of this invention.

What is claimed is:

1. A fabric constructed to act as a diffractive grating to deBroglie waves, said fabric having opposed emissive surfaces wherein one emissive surface is etched in a regular repeating pattern and the opposite emissive surface is continuous such that the thickness of the fabric and the width of the etched area determine the wavelength of diffracted radiation.

2. A method of diffracting deBroglie waves comprising:

providing a source of radiation having a given deBroglie wavelength;

allowing the radiation to impinge upon the etched surface of the fabric of claim 1;

wherein the thickness of the fabric and the width of the etched area are selected to produce constructive interference of the diffracted waves such as to increase the amplitude and energy of the wave by an amount proportional to the amplitude squared.

3. A method of diffracting deBroglie waves comprising:

providing a source of radiation having a given deBroglie wavelength;

allowing the radiation to impinge upon the etched surface of the fabric of claim 1;

wherein the thickness of the fabric and the width of the etched area are selected to produce destructive interference of the diffracted waves such as to decrease the amplitude and energy of the wave by an amount proportional to the amplitude squared.

* * * * *